(12) United States Patent
Lee et al.

(10) Patent No.: US 8,855,245 B2
(45) Date of Patent: Oct. 7, 2014

(54) METHOD AND APPARATUS FOR TRANSMITTING AND RECEIVING SIGNALS BASED ON DUAL COMPRESSIVE SENSING IN WIRELESS COMMUNICATION SYSTEM

(71) Applicants: LG Electronics Inc., Seoul (KR); Industry-Academic Cooperation Foundation, Yonsei University, Seoul (KR)

(72) Inventors: Seungmin Lee, Seoul (KR); Byounghoon Kim, Seoul (KR); Seunggye Hwang, Seoul (KR); Dongku Kim, Seoul (KR); Jeonghun Park, Seoul (KR); Youngwoo Yun, Seoul (KR)

(73) Assignees: LG Electronics Inc., Seoul (KR); Industry-Academic Cooperation Foundation, Yonsei University, Seoul (KR)

(*) Notice: Subject to any disclaimer, the term of this patent is extended or adjusted under 35 U.S.C. 154(b) by 14 days.

(21) Appl. No.: 13/709,985

(22) Filed: Dec. 10, 2012

(65) Prior Publication Data

US 2013/0148713 A1 Jun. 13, 2013

Related U.S. Application Data

(60) Provisional application No. 61/569,285, filed on Dec. 11, 2011.

(51) Int. Cl.
*H04L 27/06* (2006.01)
*H04B 1/66* (2006.01)

(52) U.S. Cl.
CPC .................................. *H04B 1/66* (2013.01)
USPC ........... 375/340; 375/220; 375/240; 375/316; 370/328; 370/329; 370/330

(58) Field of Classification Search
CPC ........ H04B 1/66; H04L 27/006; H04L 67/12; H03M 7/30
USPC .......... 375/220, 240, 316, 324, 340; 370/328, 370/329, 330
See application file for complete search history.

(56) References Cited

U.S. PATENT DOCUMENTS 8,644,244 B2 * 2/2014 Sexton et al. ................. 370/330

* cited by examiner

*Primary Examiner* — Leon Flores
(74) *Attorney, Agent, or Firm* — Birch, Stewart, Kolasch & Birch, LLP

(57) ABSTRACT

A method for transmitting signals based on dual sensing in a wireless communication system is disclosed. One or more sensor nodes receive Gaussian codes corresponding respectively to the one or more sensor nodes, allocated from a fusion center. The one or more sensor nodes determine whether to operate at a specific time. At least one sensor node that has determined to operate among the one or more sensor nodes multiplies the Gaussian codes by a transmission signal and transmits the multiplied signal to the fusion center.

3 Claims, 5 Drawing Sheets

METHOD AND APPARATUS FOR TRANSMITTING AND RECEIVING SIGNALS BASED ON DUAL COMPRESSIVE SENSING IN WIRELESS COMMUNICATION SYSTEM

This application claims the benefit of U.S. Provisional Patent Application No. 61/569,285, filed on Dec. 11, 2011, which is hereby incorporated by reference as if fully set forth herein.

BACKGROUND OF THE INVENTION

1. Field of the Invention

The present invention relates to a wireless communication system, and more particularly, to a method and apparatus for transmitting and receiving signals based on dual compressive sensing in a wireless communication system.

2. Discussion of the Related Art

A wireless Sensor Network (WSN) refers to a system for obtaining various information from a plurality of sensor nodes. In recent years, with an increase in sensor nodes and an increase in the amount of observed information, questions about high-dimensional signal processing have been raised and studies thereon has increased. To solve an increase of communication traffic caused by the occurrence of a high-dimensional signal in the WSN, research has been conducted into a distributed compression method, such as entropy coding (see R. Cristescu, B. Beferull-Lozano, M. Vetterli, and R. Wattenhofer, "Network correlated data gathering with explict communication," IEEE/ACM Trans. On Networking, 14(1): 41-54, February 2006, hereinafter, referred to as Reference 1) and Slepian-Wolf coding (see D. Slepian and J. K. Wolf, "Noiseless coding of correlated information sources," 19:471-480, July 1973, hereinafter, referred to as Reference 2). However, conventional distributed compression technologies are disadvantageous in that information such as a correlation between information acquired by distributed nodes should be known in advance in order to perform compression. In addition, since sensor nodes of the WSN that require low complexity are required to process high operation throughput, it is not appropriate to actually apply the conventional distributed compression technologies.

Compressive sensing refers to a scheme of converting a high-dimensional signal into a low-dimensional signal so that an observed, or stored and compressed signal can be recovered into an original high-dimensional signal with high probability. Recently, compressive sensing has been studied in a variety of fields. For basic theory about compressive sensing, reference may be made to D. Donoho, "Compressive Sensing," IEEE Trans. Inform. Theory, vol. 52, no. 4, pp. 1289-1306, April 2005 (hereinafter, referred to as Reference 3).

Compressive sensing has drawn attention, due to a few unique characteristics, as a future technology capable of solving problems in the WSN having a plurality of sensor nodes and a large amount of information. The biggest advantage of compressive sensing in the WSN is that it is easy to perform distributed compression. As opposed to conventional distributed compression schemes such as entropy coding and Slepian-Wolf coding, a compressive sensing technique has been greatly spotlighted as a future technique for high-dimensional signal processing of the WSN because distributed compression can be performed through a simple linear operation without previously receiving additional information in a compression process (see C. Luo, F. Wu, J. Sun and C. W. Chen, "Compressive data gathering for large scale wireless sensor networks," Mobicom '09, September 2009, hereinafter, referred to as Reference 4). However, research into a WSN to which compressive sensing is applied are still in an early stage and various in-depth studies have not been carried out.

SUMMARY OF THE INVENTION

Accordingly, the present invention is directed to a method and apparatus for transmitting and receiving signals based on dual compressive sensing in a wireless communication system that substantially obviates one or more problems due to limitations and disadvantages of the related art.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

In accordance with an aspect of the invention, a method for transmitting signals based on dual sensing in a wireless communication system includes receiving, at one or more sensor nodes, Gaussian codes corresponding respectively to the one or more sensor nodes, allocated from a fusion center, determining, at the one or more sensor nodes, whether to operate at a specific time, and multiplying, at least one sensor node that has determined to operate among the one or more sensor nodes, the Gaussian codes by a transmission signal and transmitting the multiplied signal to the fusion center, wherein a first measurement matrix for recovering a signal received by the fusion center from the at least one sensor node that has determined to operate is defined as a set of the Gaussian codes.

The signal Z received by the fusion center may be expressed as Equation A:

$$Z = \Phi_G x_{on} \quad \text{[Equation A]}$$

where $\Phi_G$ is the first measurement matrix and $x_{on}$ is a vector signal to be recovered.

The vector signal $x_{on}$ to be recovered may be expressed as Equation B:

$$x_{on_i} = \begin{cases} x_i, & i \in S_{active} \\ 0, & i \notin S_{active} \end{cases} \quad \text{[Equation B]}$$

where $S_{active}$ denotes a set of the at least one sensor nodes that has determined to operate.

The first measurement matrix $\Phi_G$ may be expressed as Equation C:

$$\Phi_G = [\phi_{G_1}, \phi_{G_2}, \ldots, \phi_{G_N}] \quad \text{[Equation C]}$$

where $\phi_{G_N}$ denotes the Gaussian codes.

The vector signal $x_{on}$ may be expressed by a vector y of non-zero values by the fusion center and a relationship between a final detection signal x and the vector y is expressed by a second measurement matrix $\Phi_R$ indicating whether the one or more sensor nodes operate.

The relationship between the final detection signal x and the vector y may be expressed as Equation D:

$$y = \Phi_R x \quad \text{[Equation D]}$$

In accordance with an aspect of the invention, a method for receiving signals based on dual sensing from one or more sensor nodes at a fusion center in a wireless communication system includes allocating Gaussian codes corresponding respectively to the one or more sensor nodes, and receiving a signal expressed by multiplication of the Gaussian codes and a transmission signal from at least one sensor node that has determined to operate among the one or more sensor nodes, wherein a first measurement matrix for recovering the signal received from the at least one sensor node that has determined to operate is defined as a set of the Gaussian codes.

The signal Z received from the at least one sensor node that has determined to operate may be expressed as $Z=\Phi_G x_{on}$ (where $\Phi_G$ is the first measurement matrix and $x_{on}$ is a vector signal to be recovered).

The vector signal $x_{on}$ is expressed by a vector y of non-zero values by the fusion center and a relationship between a final detection signal x and the vector y is expressed by a second measurement matrix $\Phi_R$ indicating whether the one or more sensor nodes operate.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Figure 1:
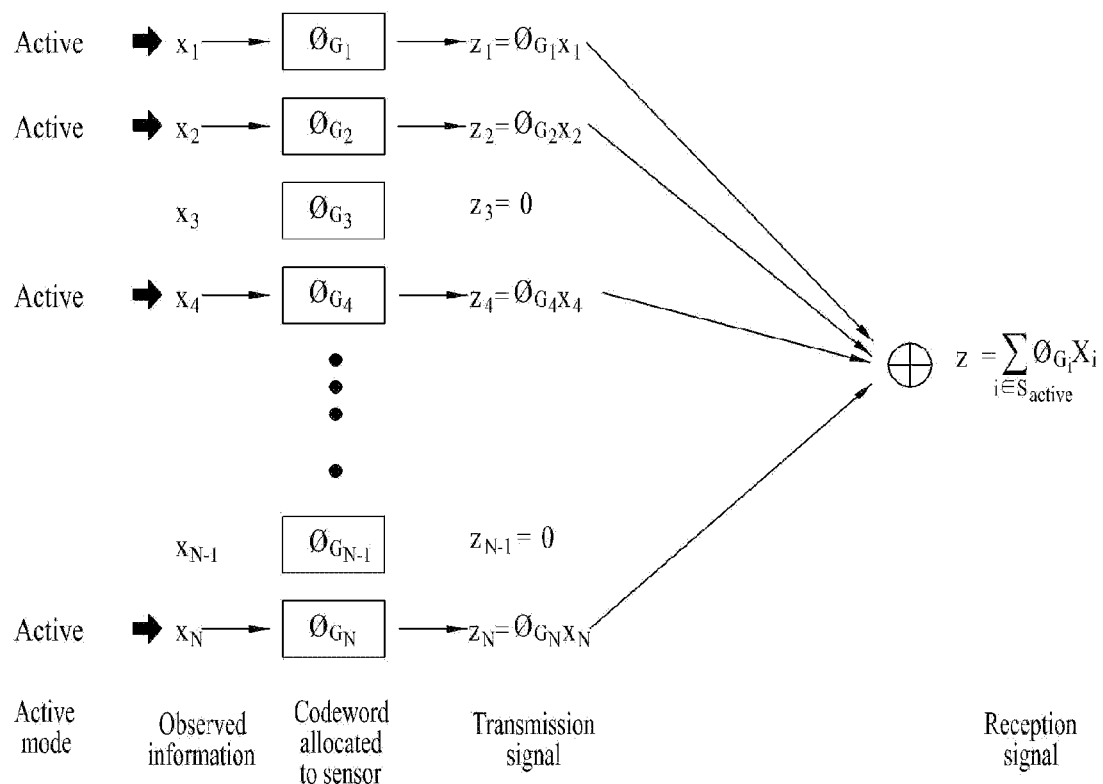
FIG. 1 illustrates a concept of a transmission and reception step of sensing information according to the present invention.

The constructions, functions, and other features of the present invention will be more clearly understood from the following detailed description taken in conjunction with the accompanying drawings.

Prior to description of the present invention, compressive sensing will now be described in brief.

1) Compressive Sensing

Compressive sensing is a signal acquisition technique which has attracted attention recently and is applied to various situations such as a sensor network, image sensing, etc. The core of compressive sensing technology is that, if there is a discrete time signal of length N and the discrete time signal is expressible as a sparse signal, then the discrete time signal can be compressed to a signal of length M, M being less than N, and the original signal of length N can be recovered from the compressed signal.

A sparse signal refers to a signal in which only a small number of partial elements has a meaningful magnitude value relative to magnitude of all dimensions expressing the signal. As an example, if a signal $s \in R^N$ has a property of $\|s\|_0 = K$ where $K \ll N$, the signal S may be called a sparse signal. Herein, $\|s\|_0$ denotes the number of elements having non-zero values in the signal S. K is called sparsity and is a criterion indicating the amount of a sparse degree.

Although most signals present in the natural world have a difficulty in being expressed as sparse signals, in some cases, signals may be expressed as sparse signals through transformation using a specific basis matrix. If a specific signal $x \in R^N$ can be expressed as a sparse signal S by a basis matrix $\Psi \in R^{N \times N}$, a relationship between the specific signal, the basis matrix, and the sparse signal may be expressed as indicated by Equation 1.

$$X = \Psi S \quad \text{[Equation 1]}$$

The basis matrix $\Psi$ satisfying the relationship such as Equation 1 is called a sparse basis matrix and refers to a matrix converting a specific signal into a sparse form. If the basis matrix $\Psi$ is accurately known, compressive sensing for x can be performed.

A compression process in compressive sensing is performed through a linear operation of the sparse signal s or the signal x which is convertible into the sparse signal and a measurement matrix. A sparse signal of magnitude N can be compressed to a signal of magnitude M when the measurement matrix satisfies a specific condition and a relationship between the measurement matrix $\Phi \in R^{M \times M}$, a compressed signal y, and the sparse signal s or the specific signal x may be expressed as follows.

$$y = \Phi x = \Phi \Psi s \quad \text{[Equation 2]}$$

The specific condition which should be satisfied by the measurement matrix for compressive sensing is called Restricted Isometry Property (RIP) and this condition is expressed as Equation 3.

$$1 - \delta \leq \frac{\|\Phi x\|_2^2}{\|x\|_2^2} \leq 1 + \delta, \quad \text{[Equation 3]}$$
$$\text{for } \forall \|x\|_0 = 2K$$

The above condition should be satisfied by the measurement matrix so as to perform compressive sensing for a signal, sparsity of which is K. In brief, the condition is that, even if a signal, sparsity of which is 2K, is converted by the measurement matrix, a length characteristic of $l_2$ norm of the signal is not greatly varied. For a detailed description of the RIP condition, refer to the above Reference 3.

As a well-known measurement matrix satisfying the above Equation 3, a Gaussian random matrix or Bernoulli random matrix has been proved. In order for such a matrix to meet the RIP condition, a magnitude of a row of the measurement matrix and a magnitude M of a compressed signal should satisfy a boundary value condition indicated by Equation 4.

$$M \geq cK \log(N/K) \quad \text{[Equation 4]}$$

where c is an arbitrary constant. Experimentally, when using a value between 1 and 2 as c, probability of restoration failure is lowered below 0.10. The boundary value condition has been proven in the above Reference 3 and reference 5 (E. Candès, J. Romberg, and T. Tao, "Robust uncertainty principles: Exact signal reconstruction from highly incomplete frequency information," IEEE Trans. on Information Theory, 52(2) pp. 489-509, February 2006).

As a method for searching for an original signal x from a compressed signal y, a convex algorithm using $l_1$-minimization as indicated by Equation 5 is well known.

$$\min \|s\|_1$$
$$\text{s.t } y = \Phi\Psi s \quad \text{[Equation 5]}$$

When using the above optimization method known as Basis Pursuit, a sparse signal s can be detected and the original signal x can be recovered from the compressed signal y by calculating X=ΨS from the detected sparse signal s.

2 Conventional Research on Application of Compressive Sensing in WSN

In summary, conventional research for applying compressive sensing to the WSN may be largely divided into two methods. A first method is to perform compressive sensing using a sparse signal when all information transmitted from sensors is expressed in a sparse form through linear transformation by a specific basis matrix. This method has an advantage of reducing entire traffic of the WSN by compressing the total magnitude of signals transmitted between sensors and between a sensor and a final receiving end. In addition, sharing or cooperation of information between sensor nodes is not necessary in a compression process for traffic reduction and distributed compression can be performed through a simple linear operation. Using these advantages, a method has been studied for estimating total data by collecting information only on a portion of sensor nodes instead information transmitted by all nodes, when it is desired to acquire observed information of all sensor nodes in the WSN. This method can achieve low-power communication by reducing an operation time of sensor nodes and improve lifespan of the WSN. However, in this case, information of each sensor node should be transmitted through an independent channel and a final receiving end for collecting and recovering information should be aware of information as to which sensor transmits which information. To solve such problems, conventional research has proposed compressive sensing using a selection matrix (see F. Fazel, M Fazel, M. Stojanovic, "Random access compressed sensing for energy efficient underwater sensor networks," Selected Areas in Communications, Vol. 29, issue 8, pp. 1660-1670, September 2011, hereinafter, referred to as Reference 6).

The selection matrix is a matrix including information as to which sensor operates. The selection matrix has a form extracting some rows from an identity matrix. As an example, a situation in which 8 sensor nodes are present and 5 sensor nodes thereamong operate is considered. In this case, one example of the selection matrix is indicated by Equation 6.

$$\Phi = \begin{bmatrix} 0 & 0 & 0 & 1 & 0 & 0 & 0 & 0 \\ 0 & 1 & 0 & 0 & 0 & 0 & 0 & 0 \\ 0 & 0 & 0 & 0 & 0 & 0 & 1 & 0 \\ 1 & 0 & 0 & 0 & 0 & 0 & 0 & 0 \\ 0 & 0 & 0 & 0 & 0 & 1 & 0 & 0 \end{bmatrix} \quad \text{[Equation 6]}$$

In Equation 6, the number of rows is equal to the number of operating sensor nodes or the number of independent channels received by the final receiving end and each row includes information about an index of a sensor which transmits a signal through an independent channel. At this time, the index is a certain number for distinguishing between sensor nodes by numbering the sensor nodes and the position of one '1' in each row indicates an index of an operating sensor. In this case, Equation 6 is used as a measurement matrix for compressive sensing and information as to which sensor transmits which information can be obtained through this matrix. It is assumed that information acquired from a whole WSN is x and an i-th element $x_i$ of the x vector is information acquired by an i-th sensor node. According to the above assumption, x can be expressed as a vector of a sparse form and expressed as s by a certain basis matrix Ψ. In this case, a compressed signal y can be expressed as a compressive sensing form as indicated by Equation 7.

$$y = \Phi x = \Phi \Psi s \quad \text{[Equation 7]}$$

The compressed signal y as the result of Equation indicates information obtained by selectively collecting only partial elements of x. The receiving end may recover s from y using a recovery algorithm of compressive sensing and recover x using the result of the recovered signal s. However, in this method, in order for the receiving end to discern information about Φ, a prescheduled selection matrix should be present or information as to whether which sensor node participates in transmission and through which channel a signal is received should be additionally known.

Another method of research is to sense whether sensor nodes operating periodically or aperiodically are in an active mode in which sensor nodes participate in transmission of information. If the sensor nodes participate in transmission for collecting a signal of a WSN through an active mode, an operation sensing technique is needed to determine which sensor transmits information. In this case, a sparse characteristic generated when the number of active nodes is less than the total number of sensor nodes appears and compressive sensing using the sparse characteristic may be applied. In this method, all sensors in an active mode transmit signals indicating whether the sensors operate at a specific transmission time through the same channel using allocated codes and active nodes are identified using a recovery process of compressive sensing from received signals. In the case of the conventional methods, in order for the WSN to distinguish between sensors, an orthogonal code should be allocated to each sensor node. However, active mode detection technology based on compressive sensing is advantageous in that an active mode of a sensor can be detected with high probability even when a non-orthogonal code of a relatively small length is used.

3) Proposed Invention

The present disclosure proposes a method for solving conventional problems by performing compressive sensing twice without receiving additional advance information as to whether a sensor node operates in a WSN using compressive sensing utilizing a correlation. The proposed method has advantages of reducing an increase of additional packets for informing whether a sensor node operates when compressive sensing is used in a dynamically operating WSN and of not increasing additional complexity in each sensor node.

Furthermore, the proposed method in this disclosure is applicable to a variety of application fields using a plurality of nodes in addition to a WSN. As the prospect that Machine-to-Machine (M2M) communication will be a core technology of future communication has arisen, a situation occurs in which a plurality of devices is connected to each other in the course of collecting and exchanging information of nodes even in techniques such as Device-to-Device (D2D) and M2M.

Technology such as a smart grid or ubiquitous technique which is necessary to collect information from a plurality of sensors and control the information needs to be combined with technology capable of dealing with a large amount of data with high efficiency. When simultaneously considering a process in which a plurality of nodes is dynamically connected to each other and exchange information and a structure in which distributed compression is performed, the proposed method reduces the entire amount of traffic of a network and lowers complexity and the amount of operations, thereby being suitable to devices requiring low power and low complexity.

The measurement matrix Φ used in conventional compressive sensing has the form of a selection matrix. If a channel is allocated by a determined selection matrix, all sensor nodes require memories for holding information of the selection matrix and, if dynamic routing is used, a radio resource for indicating operation information of sensors is additionally consumed. Therefore, gain caused by compressive sensing is lowered.

Accordingly, the present invention proposes a dual compressive sensing technique for overcoming the above disadvantages through a method for performing a compressive sensing recovering process for detecting sensors that are transmitting signals and a compressive sensing process for detecting information of an entire sensor network. The proposed method will be separately described as three steps.

3-1) Transmission and Reception Step of Sensing Information.

FIG. 1 illustrates a concept of a transmission and reception step of sensing information according to the present invention.

Referring to FIG. 1, a wireless sensor network environment in which N sensor nodes are present and information obtained by the N sensor nodes has a correlation is considered. If there is a correlation between information acquired by distributed nodes, the information may be converted into a specific sparse signal expressed by a small number of relatively sparse determined values compared with the magnitude of an entire signal based on conventional research using a compressive sensing theory. Further, an original signal may be restored using a sparse property by collecting only partial data of magnitude less than the magnitude of the entire signal without receiving the entire signal.

Using this compressive sensing property capable of restoring the original signal only by partially obtained information, a wireless sensor network system in which only partial sensors operate to transmit information and information of sensors that do not participate in transmission is recovered using the partially obtained information is designed. Activation/inactivation of sensors is randomly determined distributively in each sensor without additional control. A set of sensors participating in transmission at a specific transmission time is defined as $S_{active}$. If activation of an i-th sensor node is determined, the active node generates a transmission signal by multiplying each allocated codeword $\phi_{G_i} \in R^M$ by a signal $x_i \in R$ observed thereby. The generated transmission signal is indicated by Equation 8.

$$z_i = \Phi_{G_i} x_i \quad \text{[Equation 8]}$$

The allocated codeword $\phi_{G_i}$ is a column vector constituting a measurement matrix $\Phi_G \in R^{M \times N}$, of compressive sensing and is used in a recovery process for searching for activation information of a sensor in a first recovery step. For generation of the codeword, a Gaussian code used generally in compressive sensing is used. It is assumed that codewords allocated to respective sensors do not overlap and are previously scheduled between the sensors and a receiving end. The transmission signal generated in a sensor node belonging to $S_{active}$ is collected in the receiving end and a collected signal $z \in R^M$ is expressed as indicated by Equation 9.

$$z = \sum_{i \in S_{active}} \phi_{G_i} x_i \quad \text{[Equation 9]}$$

The above equation may be converted into a linear operation form using a measurement matrix $\Phi_G$ generated by a combination of codeword vectors, which is a general expression in compressive sensing. From the perspective of z, since information obtained by sensors that do not belong to $S_{active}$ has no effect on z, there of not effect on any result even though the information is regarded as 0. Using this fact, a new vector $x_{on}$ for expressing z as a general form in compressive sensing is defined as follows.

$$x_{on} = \begin{cases} x_i, & i \in S_{active} \\ 0, & i \notin S_{active} \end{cases} \quad \text{[Equation 10]}$$

Since only partial sensors operate relative to all sensor nodes, $x_{on}$ has a sparse form and sparsity generated at this time is defined as on-off sparsity. An expression of z using $x_{on}$ is indicated by Equation 11.

$$Z = \Phi_G x_{on} \quad \text{[Equation 11]}$$

The measurement matrix $\Phi_G = [\phi_{G_1}, \phi_{G_2}, \ldots, \phi_{G_N}]$ is a combination of codewords allocated to respective sensors.

3-2) First Recovery Step (Compressive Sensing Restoration for Searching for Activation Information of Sensors)

Figure 2:
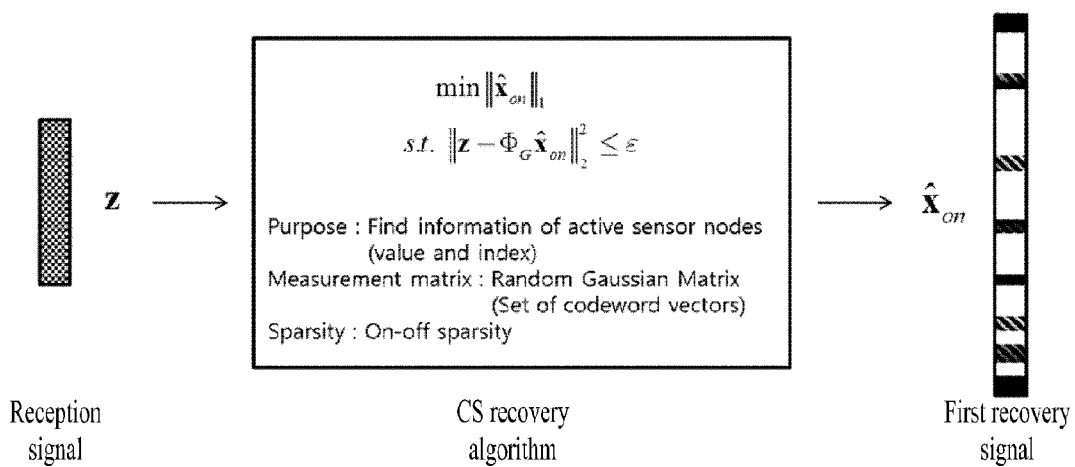
FIG. 2 illustrates a concept of a first recovery step according to the present invention.

FIG. 2 illustrates a concept of a first recovery step according to the present invention.

Referring to FIG. 2, the first recovery step is to detect whether a sensor is activated from a received signal and simultaneously restore a value of a signal transmitted from an active sensor node. To this end, this step performs compressive sensing restoration using on-off sparsity generated depending on whether a sensor operation is activated and searches for $x_{on}$ in which only information of each active node is indicated from entire information X and information of the other nodes is filled with 0. At this time, a recovery algorithm of generally used compressive sensing is used. As a measurement matrix, a random Gaussian matrix $\Phi_G$, consisting of a combination of codeword vectors allocated to respective sensors is used.

Using the above defined relationship equation between z and $x_{on}$ and a sparse property of $x_{on}$, a process of estimating $x_{on}$ through z using a compressive sensing recovering process may be expressed as indicated by Equation 12.

$$\min \|\hat{x}_{on}\|_1 \\ \text{s.t. } z = \Phi_G \hat{x}_{on} \quad \text{[Equation 12]}$$

On-off sparsity used in the first recovery step is determined by the number of active sensor nodes. According to research related to conventional compressive sensing, the magnitude of a compressed measurement signal necessary for guaranteeing restoration success with high probability should have a value greater than a boundary value. The boundary value varies with the total magnitude of an original signal and a degree of sparsity. In the first recovery step, the magnitude of a compressed signal is the magnitude of z and is the same as the length of a codeword allocated to each sensor node. If the number of active sensors in the transmission step among a total of N nodes is L, the boundary value of the magnitude of Z based on conventional research is as follows.

$$M \geq c_1 L \log(N/L) \quad \text{[Equation 13]}$$

where $c_1$ is an arbitrary constant.

3-3) Second Recovery Step (Compressive Sensing Restoration for Estimating Information of Inactive Sensors)

Figure 3:
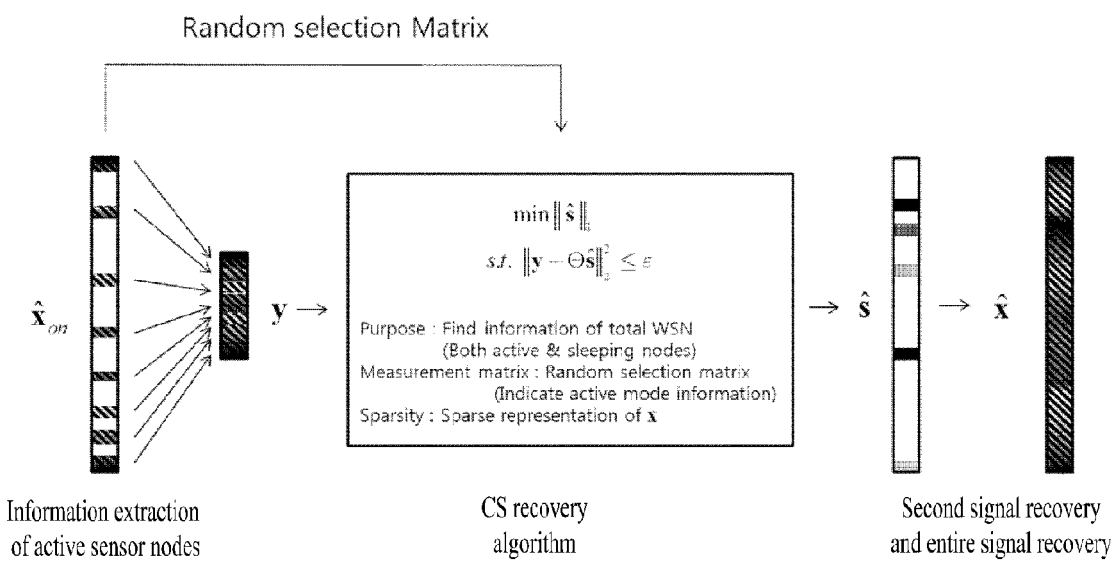
FIG. 3 illustrates a concept of a second recovery step according to the present invention.

FIG. 3 illustrates a concept of a second recovery step according to the present invention.

Referring to FIG. 3, the second recovery step is to restore X which is a set of information of all sensor nodes using the result of the first recovery step. While a received signal includes only information of sensors in an active mode, an object of this second recovery step is to search for information of inactive nodes using a compressive sensing principle through a correlation between information obtained by the above assumed active sensors. The result of the first recovery step, $\hat{x}_{on}$, indicates a result of searching for a signal transmitted by active sensors. Since the result of the first recovery step uses on-off sparsity of sensor nodes, information of inactive nodes has been restored as 0 or a meaningless value of a relatively low absolute value. Two information items necessary for the second recovery step may be extracted from the result of the first recovery step. One is a measurement matrix for determining an active node, which is information such as a random selection matrix and the other is a signal value transmitted by an active node constituting $y \in \mathbb{R}^L$.

A first process for the second recovery step is to construct a vector y by sequentially arranging values determined as active nodes in $\hat{x}_{on}$. The vector y serves as a reception signal in the second recovery step and functions to configure constraints in the recovering process.

A second process is to construct a measurement matrix $y \in \mathbb{R}^{L \times N}$ serving as the random selection matrix. Under the assumption that a reliable result is obtained from the first recovery step, the vector y may be regarded as a vector arranged by partial elements of $x_{on}$. A random selection matrix $\Phi_R$ consisting of 0 and 1, which may constitute y, may be constructed through a linear operation with x using a relationship between the two vectors. The random selection matrix is designed to have a form of extracting some rows from an identity matrix. Each row of the matrix has one 1 and the other elements of each row are filled with 1s. The value of 1 serves to connect a value of the vector y corresponding to each row to a value of a sensor node in x. A relationship between $x_{on}$ and y through the matrix $\Phi_R$ is indicated by Equation 14.

$$y = \Phi_R x \quad \text{[Equation 14]}$$

It is well known through conventional research that $\Phi_R$ satisfies a RIP condition and can be used as a measurement matrix for compressive sensing (see Reference 6). However, the above equation cannot be immediately used for a compressive sensing based recovery algorithm because the value of x does not have a sparse form. Accordingly, x is expressed as s, which is a sparse signal form, using a basis matrix $\Psi$ based on the characteristic of a correlation between information obtained by the above assumed active sensor nodes.

$$y = \Phi_R x = \Phi_R \Psi s = \Theta s \quad \text{[Equation 15]}$$

where $\theta$ is a new measurement matrix formed by multiplication of $\Phi_R$ and $\Psi$. A compressive sensing based recovery algorithm designed using the above relationship equation is indicated by Equation 16.

$$\min \|\hat{s}\|_1 \quad \text{[Equation 16]}$$
$$\text{s.t.} \quad y = \Theta \hat{s}$$

An estimation value $\hat{x}$ of information collected from an entire wireless sensor network may be acquired through a relationship equation using a sparse signal $\hat{s}$ restored through the recovery algorithm and using the basis matrix $\Psi$.

$$\hat{x} = \Psi \hat{s} \quad \text{[Equation 17]}$$

Sparsity in the second recovery step is determined by values other than 0 in the sparse signal S or the number of partial values having a large absolute value. These values are defined as sparsity. Since the compressive sensing based recovery algorithm is used even in the second recovery step, the boundary value of a minimized magnitude of a compressed signal necessary for restoration is present as in the first recovery step. In this case, a signal in charge of the compression signal used for restoration is y. The magnitude of y is equal to the number of sensor nodes in an active mode and, therefore, may be expressed as L used in the first recovery step. Accordingly, the boundary value of the magnitude of the compression signal necessary for the second recovery step is a factor for determining the number of sensor nodes participating in transmission in an active mode.

$$L \geq c_2 K \log(N/K) \quad \text{[Equation 18]}$$

Where $c_2$ is an arbitrary constant.

Simulation for a performance improvement effect according to dual compressive sensing of the present invention will be described below.

In this simulation, it is assumed that a wireless sensor network includes 100 sensors. An i-th sensor obtains information of $x_i$ and a set of information obtained by all sensors is defined as x. x is designed to have sparsity of K by a specific sparse basis matrix. To compare performance in this experiment, the magnitude of channel utilization for obtaining a target Mean Squared Error (MSE) is used. The MSE is defined as an average of $$\frac{\|x - \hat{x}\|_2^2}{\|x\|_2^2}$$

where $\hat{x}$ is a restored signal as a relationship between an original signal and a restored signal. Channel utilization refers to the number of channels for transmitting information necessary for restoration, satisfying the target MSE in this experiment. The target MSE is determined as 0.1 in this experiment.

The number of channel utilizations is measured under the assumption of two scenarios. The first scenario assumes the following situation. Sensors transmit information to a fusion center in a single hop. The numbers of channel utilizations necessary for the conventional technique and the proposed technique are N and M, respectively.

In this case, M is the length of a Gaussian code. If the Gaussian code is not used, although all information may be restored only by L pieces of sensor information, N channels are needed because a routing table should be configured. Meanwhile, when the Gaussian code is used, since the routing table can be estimated by the code, as many channels as M, which is the length of the Gaussian code, are needed.

In the case of a signal received through multiple hops, since it is impossible to distinguish between sensors through independent allocation of channels in a final sink node, additional overhead occurs in a process in which each node indicates index information thereof. Accordingly, in a multi-hop situation, channel utilization considering overhead for transmitting index information should be performed. Meanwhile, in the proposed technique, since all processes are performed by a compressive sensing based technique, it is possible to transmit signals without incurring additional overhead even in the multi-hop situation. The number of channel utilizations in the multi-hop situation is calculated from Equation 19.

$$L+L \log_2(N) \qquad \text{[Equation 19]}$$

In Equation 19, L is the number of operating nodes (sensors) and N is the number of all nodes.

As described above, the number of channel utilizations when the Gaussian code is not used in a multi-hop situation is N and the number of channel utilizations when a routing table is estimated using the Gaussian code is M.

Accordingly, when the Gaussian code is not used, since information of L sensors in an active mode and bits including indexes of the sensors should be transmitted, the number of channel utilizations in the multi-hop situation may be indicated as shown in Equation 19.

In the case in which the Gaussian code is used, since the length of a code is equal to the number of channel utilizations, utilizations are performed M times.

Figure 4:
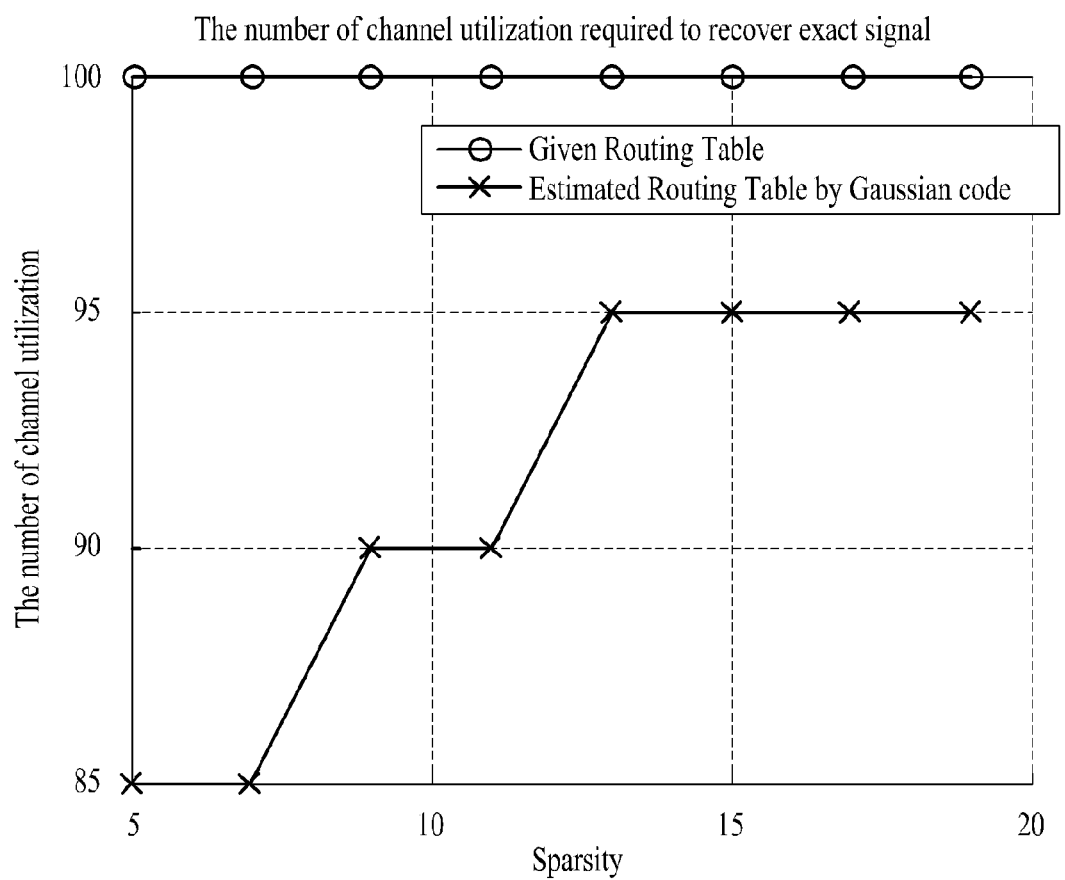
FIG. 4 illustrates the number of channel utilizations according to sparsity of a signal in a single-hop situation.

FIG. 4 illustrates the number of channel utilizations according to sparsity of a signal in a single-hop situation.

The first scenario exhibits a difference in performance as shown in FIG. 4. That is, when sparsity is 5, channel utilizations are reduced and, when sparsity is 15 or more, 5 channel utilizations are reduced.

Figure 5:
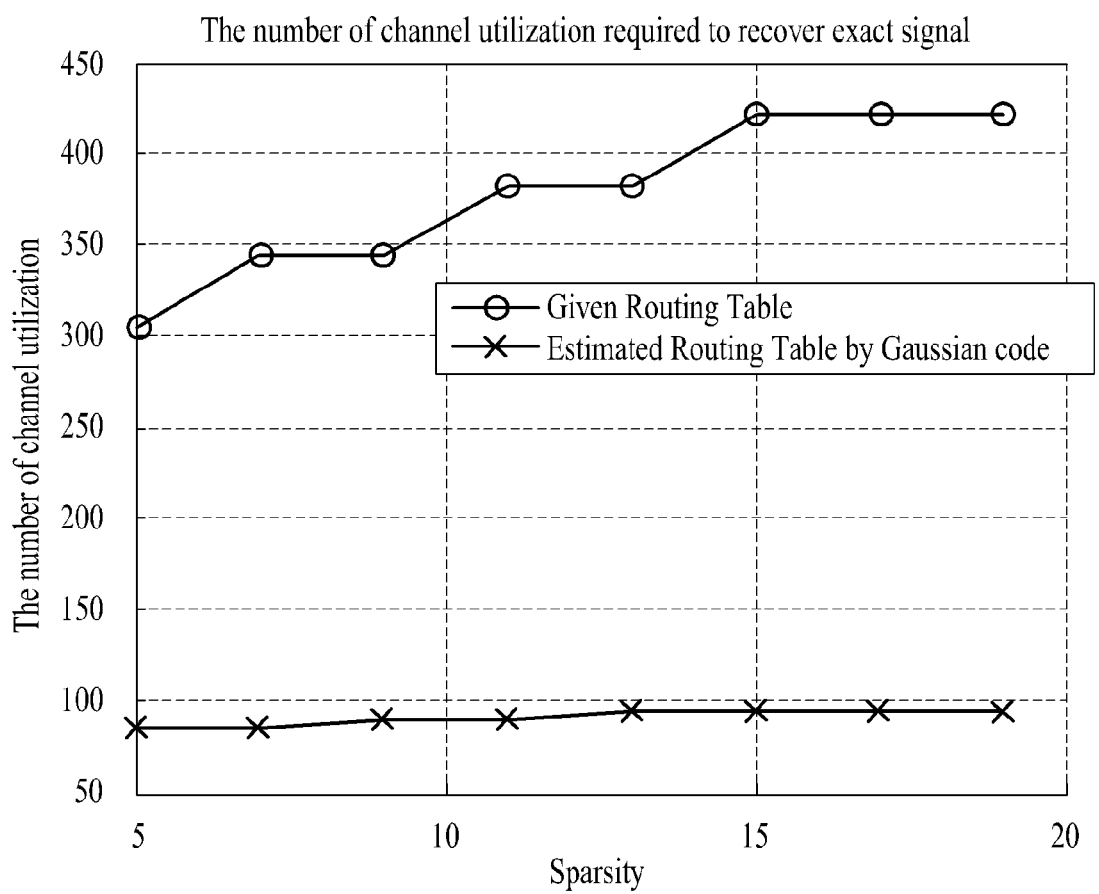
FIG. 5 illustrates the number of channel utilizations according to sparsity of a signal in a multi-hop situation.

FIG. 5 illustrates the number of channel utilizations according to sparsity of a signal in a multi-hop situation.

Referring to FIG. 5, the second scenario exhibits a big difference in performance. Namely, when sparsity is 5, 210 channel utilizations are reduced and, as sparsity increases, the number of reduced channel utilizations greatly increases. When sparsity is 19, a maximum of about 330 channel utilizations is reduced.

According to the embodiments of the present invention, when a process in which a plurality of nodes are dynamically connected to transmit and receive information and a structure in which distributed compression is performed are simultaneously considered, the entire amount of traffic of a network may be reduced and complexity and the amount of operations for compression may be reduced. Accordingly, the present invention may be applied to devices requiring low power and low complexity.

The above-described embodiments are combinations of elements and features of the present invention in a predetermined manner. Each of the elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. In the appended claims, it will be apparent that claims which are not explicitly dependent on each other can be combined to provide an embodiment or new claims can be added through amendment after this application is filed.

The embodiments according to the present invention can be implemented by various means, for example, hardware, firmware, software, or combinations thereof. In the case of a hardware configuration, the embodiments of the present invention may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In the case of a firmware or software configuration, the method according to the embodiments of the present invention may be implemented by a module, a procedure, or a function, which performs functions or operations described above. For example, software code may be stored in a memory unit and then may be executed by a processor. The memory unit may be located inside or outside the processor to transmit and receive data to and from the processor through various well known means.

The present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents and all changes coming within the meaning and equivalency range of the appended claims are intended to be embraced therein.

INDUSTRIAL APPLICABILITY

The above-described method and apparatus for transmitting signals based on dual compressive sensing in a wireless communication system are applicable to a variety of wireless communication systems.

What is claimed is:

1. A method for receiving signals based on dual sensing from one or more sensor nodes at a fusion center in a wireless communication system, the method comprising:
    allocating Gaussian codes corresponding respectively to the one or more sensor nodes;
    receiving a signal expressed as below Equation A by multiplication of the Gaussian codes and a transmission signal from at least one sensor node that has been determined to operate among the one or more sensor nodes;
    recovering a vector signal $x_{on}$ to be recovered using a first measurement matrix ($\Phi_G$) and below Equation B; and
    recovering a final detection signal x based on a result of the recovering the vector signal $x_{on}$,
    wherein the first measurement matrix ($\Phi_G$) is expressed as below Equation C:

$$z = \Phi_G x_{on}, \qquad \text{[Equation A]}$$

where z is received signals at a fusion center, $$x_{on_i} = \begin{cases} x_i, & i \in S_{active} \\ 0, & i \notin S_{active} \end{cases} \qquad \text{[Equation B]}$$

where $S_{active}$ denotes a set of the at least one sensor node that has determined to operate, and $$\Phi_G = [\phi_{G_1}, \phi_{G_2}, \ldots, \phi_{G_N}], \qquad \text{[Equation C]}$$

where $\phi_{G_N}$ denotes the Gaussian codes of Nth sensor node among the one or more sensor nodes.

2. The method according to claim 1, wherein the vector signal $x_{on}$ is expressed by a vector y of non-zero values by the fusion center and a relationship between a final detection signal x and the vector y is expressed by a second measurement matrix $\Phi_R$ indicating whether the one or more sensor nodes operate.

3. The method according to claim 2, wherein the relationship between the final detection signal x and the vector y is expressed as Equation D:

$$y = \Phi_R x \qquad \text{[Equation D].}$$

\* \* \* \* \*